United States Patent [19]
Sturgeon et al.

[11] Patent Number: 6,118,744
[45] Date of Patent: Sep. 12, 2000

[54] PARENTAL BLOCKING SYSTEM IN A DVD INTEGRATED ENTERTAINMENT SYSTEM

[75] Inventors: Derrill L. Sturgeon; Christopher A. Howard, both of Houston, Tex.

[73] Assignee: Compaq Computer Corporation, Houston, Tex.

[21] Appl. No.: 08/940,654

[22] Filed: Sep. 30, 1997

[51] Int. Cl.[7] .................................................. G11B 3/90
[52] U.S. Cl. .............................. 369/54; 369/58; 369/59; 380/4
[58] Field of Search .................................. 369/54, 58, 32, 369/84, 47, 59; 360/60; 380/3, 4, 5, 23, 25

[56] References Cited

U.S. PATENT DOCUMENTS 5,371,792  12/1994  Asai et al. ................................. 380/4
5,825,876  10/1998  Peterson, Jr. .............................. 380/4

OTHER PUBLICATIONS

Nilsson, Frank; "DVD–the storage medium for the future?"; Accessed Sept. 8, 1997; pp. 1–9.

DVD Frequently Asked Questions (with answers!); Accessed Jun. 18, 1997; http://www.videodiscovery.com/vdyweb/dvd/dvdfaq.html.

Parker, Dana J.; "DVD: The Update"; *CD–ROM Professional*, Aug. 1996; Accessed Sep. 8, 1997; pp. 1–10.

"Digital Video Disc: The Coming Revolution in Consumer Electronics"; *C–Cube Microsystems*; Accessed Jun. 23, 1997; http://www.c-cube.com/technology.dvd.html.

"Toshiba SD3006 DVD Digital Video Disc Player"; Consumer Direct Warehouse; Accessed Jun. 18, 1997; http://www.consumer-direct.com/detail.com/detail.cfm?V-PARTNO=SD3006&WEIGHT=9.0&Q=230.0.

*Primary Examiner*—Thang V. Tran
*Attorney, Agent, or Firm*—Jenkens & Gilchrist

[57] ABSTRACT

A purchaser of DVD unit establishes a list of users who may access the DVD unit, and corresponding restrictions that apply to each user. When a user attempts to play a DVD disc, the unit examines the DVD disc for parental management information. If the DVD disc does not contain the parental management information, then the unit will only permit access if the user has no content restrictions. If the DVD disc does contain the parental management information, then the unit will compare it to the restrictions applicable to the user. Where the parental management information indicates that the material exceeds the restrictions applicable to the user, the unit will not play the DVD disc.

22 Claims, 3 Drawing Sheets

PARENTAL BLOCKING SYSTEM IN A DVD INTEGRATED ENTERTAINMENT SYSTEM

FIELD OF THE INVENTION

The current invention relates to DVD technology, and more particularly to a scheme for restricting access to material suitable primarily for mature audiences.

BACKGROUND OF THE INVENTION

Achieving convergence of various information, entertainment and communications technologies has become a much sought-after goal. A highly visible example of this trend is the attempt to integrate computer technologies (such as, for example, personal computer technologies) with consumer/home electronics technologies (such as, for example, television technologies, video game technologies, video telephony, video/laser disc technologies, et cetera). It is hoped that one of the products of this convergence would be a single integrated device for information, entertainment and communications, which device can, at least in part, utilize the available communications bandwidth, mass storage and graphics handling capabilities of the personal computer (PC) to deliver, store and display a variety of applications so as to provide a seamlessly unified audio-visual environment to consumers.

The DVD technology is an advanced, digital storage technology for video, audio, data, and any combination is thereof, and is centered around a new medium (a laser readable disc) capable of storing up to about 17 gigabytes of information. As is known in the art, the copious amount of digital information is provided on the disc in accordance with a standardized format. Analogous to current consumer electronics formats, it is useful to visualize the DVD format technology as a total system that comprises a mastering facility, a physical storage/distribution medium (the disc itself) and a player.

It can be appreciated that the DVD technology comprising DVD discs and suitable players therefor provide significant advances over conventional media for content presentation.

Despite recent advances, several problems still persist. One of the more significant problems is restricting a child's access to subject material that is inappropriate for children. This problem is not unique to DVD technology, as it is inherent with any form of medium, such as radio, and television.

Past solutions have involved the development for a rating system whereby movies are judged on their content and suitability for younger audiences. Movies judged to be unsuitable for younger audiences were restricted to adults, and children were denied access to theaters where such films were being viewed.

The rising popularity of VHS presented a unique challenge in that since movies were increasingly viewed in the privacy of one's home, it was increasingly difficult to prevent children from viewing titles inappropriate for younger audiences. Because of the high availability of video cassettes, physically restricting access to a cassette became unfeasible. This was particularly the case where adults in a household kept a video library which included titles unsuitable for younger audiences.

The convergence of information and communication technology has assisted a great deal in restricting access to titles unsuitable to younger audiences. A converged technology system can read the rating of a particular title stored on a DVD disk, establish the identity of the viewer, and either play or reject a title. Typically, through the use of a password, the system can establish the identity the user, review restriction data (typically predetermined by a "master user"), and compare it to the movie rating.

While a converged technology system can be programmed to identify the user and review the restriction data, it must rely on the title itself to provide the Parental Management Information (PMI) in order to determine whether the user should be permitted to view it. The majority of titles that are stored on DVDs do not contain the PMI required by the system. In such cases, the viewer is permitted to view the title. A title unsuitable for younger audiences but without PMI is accessible to such viewers, despite the advances of DVD technology.

What is desired is a method whereby such viewers would be prevented from viewing unsuitable titles in a situation where the title does not contain PMI.

SUMMARY OF THE INVENTION

The aforementioned goal may be achieved in accordance with the principals of the present invention.

Accordingly, the invention is directed towards a method of for selectively permitting a user access to information stored on a DVD disc and received at a DVD player by establishing an identity of the user, ascertaining whether the DVD disc contains a restriction level identifier, and selectively permitting access to information stored on the DVD disc if the DVD disc does not contain a restriction level identifier.

The invention is also directed to a method for selectively permitting access to information stored on a DVD disc by ascertaining whether the DVD disc contains a restriction level identifier, establishing the identity of the user when the DVD disc does not contain a restriction level identifier, determining whether the user's access to information is restricted and denying access to information stored on said DVD disc when user's access to information is restricted and the DVD disc does not contain a restriction level identifier.

The invention is also directed to a method for selectively permitting a user to access to information stored on a DVD disc by ascertaining whether the DVD disc contains a restriction level identifier and denying access when the DVD disc does not contain a restriction level identifier.

The invention is also directed to an apparatus for selectively permitting a user to access to information stored on a DVD disc comprising an identifier for establishing an identity of the user, a restriction determiner for determining whether said user is restricted from accessing the information by a predetermined restriction, a reader for ascertaining whether the DVD disc contains a restriction level identifier and a blocker for denying access to information stored on said DVD disc where user is restricted by a predetermined restriction and the DVD disc does not contain a restriction level identifier, by the reader.

The invention is also directed to an apparatus for selectively permitting access to information stored on a DVD disc comprising a reader for ascertaining whether said DVD disc comprises restriction level identifier, an identifier for establishing the identity of the user when the DVD disc does not a comprise restriction level identifier, a restriction determiner for determining whether predetermined restrictions restrict the user from accessing information and a blocker for denying access to information stored on said DVD disc when the user is restricted from accessing information.

The invention is also directed to an apparatus for selectively permitting access to information stored on a DVD disc comprising a reader for ascertaining whether the DVD disc comprises a restriction level identifier, a comparator for comparing restriction level identifier of the DVD to one or more predetermined restrictions, a validator for requesting from user proof of authorization to access information exceeding a predetermined restriction when the restriction level identifier of the DVD exceeds one or more predetermined restrictions and an access permitter for permitting access to information on the DVD where proof of authorization is provided.

The invention is also directed to an apparatus for selectively permitting a user to play a DVD disc comprising an identifier for establishing an identity of the user, a reader for determining whether the DVD disc contains a restriction level identifier and an access permitter for selectively permitting access to information stored on the DVD disc if the DVD disc does not contain a restriction level identifier.

DETAILED DESCRIPTION

Figure 1:
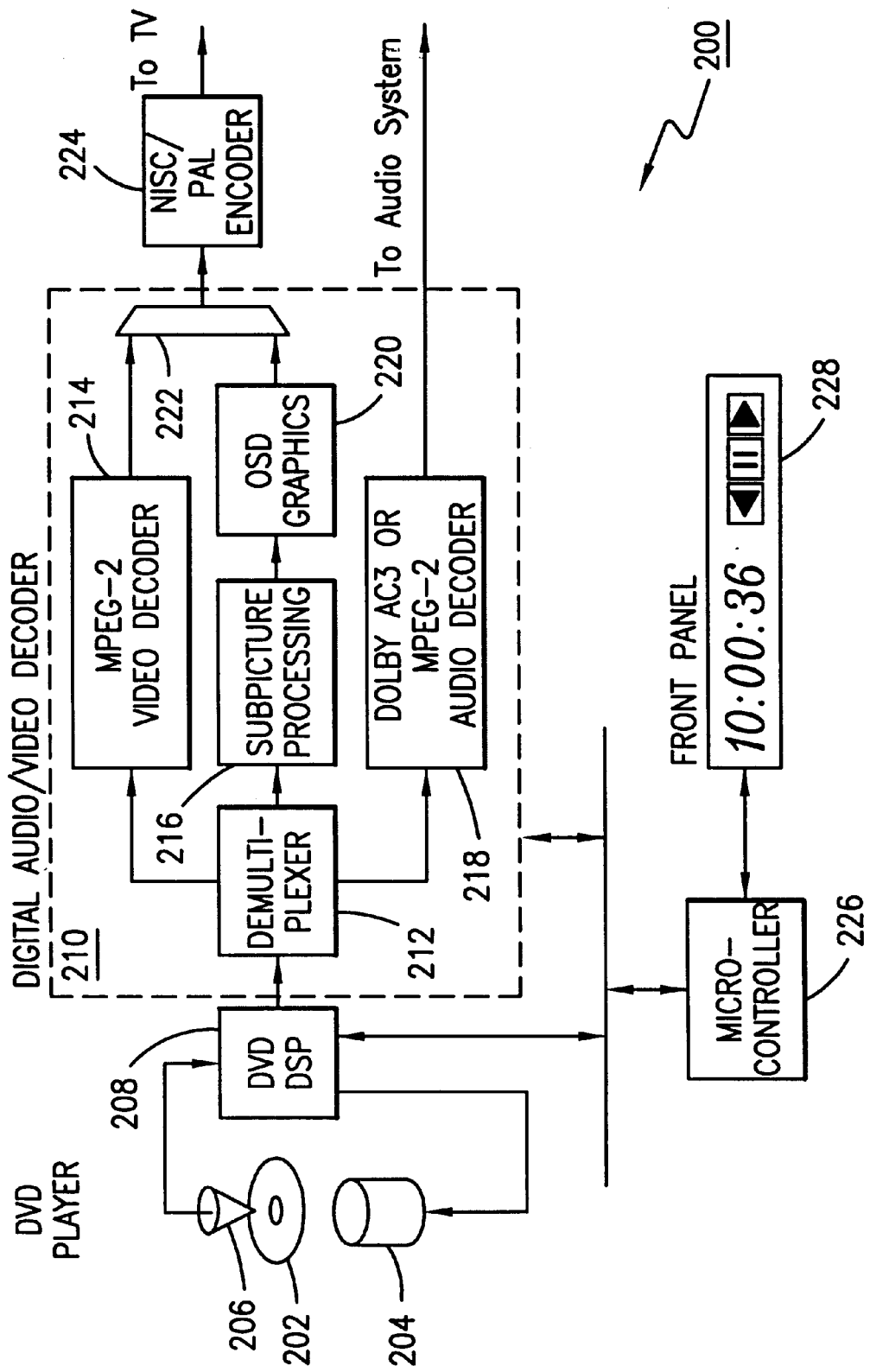
FIG. 1 is an illustration of a DVD player.

With reference now to the figures wherein like or similar elements are designated with identical reference numerals, there are depicted block diagrams of TV/PC systems in accordance with the method and system of the present invention. The purpose of these block diagrams is to illustrate the features of the invention and the basic principles of operation of an embodiment thereof. These block diagrams are not necessarily intended to schematically represent particular modules of circuitry or any particular data or control paths.

FIG. 1 depicts the block diagram of a typical DVD player 200 for the playback of a DVD disc 202. A disc reader mechanism is provided with the player 200, which mechanism comprises a motor 204 for spinning the disc 202 and a laser 206 that reads the digital information therefrom. Typically, the laser 206 is operable in the "red" portion of the visible light spectrum. A DVD-compliant digital signal processor (DSP) 208 is provided in a feedback arrangement with the disc reader mechanism for translating the laser pulses generated from the laser 206 back into electrical form.

At the heart of the player 200 is a digital audio/video (AV) decoder 210 that receives electrical signals from the DSP 208 for further processing. The AV decoder 210 comprises several important functional blocks which act on the received electrical signals at various stages of processing. The composite signal information is initially separated by a demultiplexer 212 which provides video content stream to a video decoder 214, compressed bitmaps to a subpicture processor 216, and audio content stream to an appropriate audio decoder 218. The subpicture processor 216 provides the processed subpicture information to an OSD graphics tool 220. A video multiplexer 222 controllably presents the decoded video information from the video decoder 214 and the output from the OSD graphics tool 220 to an appropriate TV signal encoder 224 (such as, for example, the National Television Standards Committee (NTSC) signal format, or the Phase Alternate Line (PAL) signal format), which then provides a suitable TV signal to a TV (not shown) for playback. The decoded audio information from the audio decoder 218 may be provided to an appropriate audio system which may or may not be integrated with the TV. A microcontroller 226 is provided as part of the DVD player 200 for supervising the operation thereof. As can be readily seen, the microcontroller 226 may be engaged by the user via a remote control or front panel 228 for translating user inputs into commands for the audio/video decoder 210 and/or the disc reading mechanism of the player 200.

Figure 2:
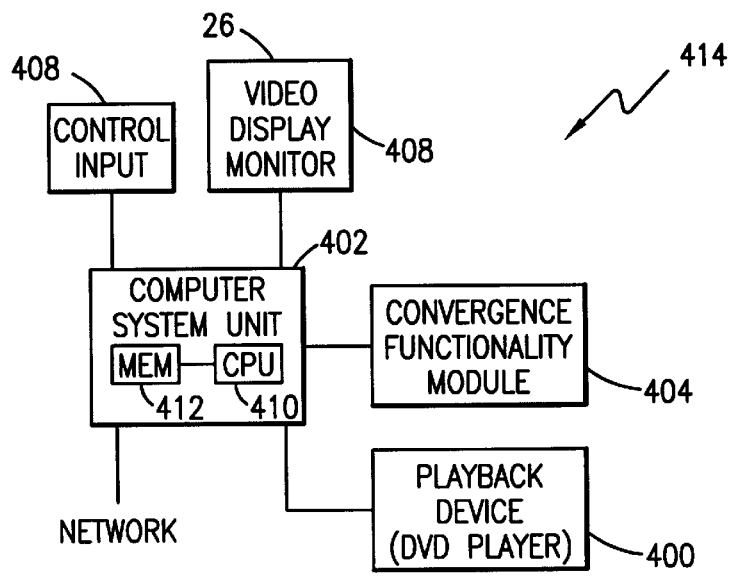
FIG. 2 is a block diagram of a converged technology system configurable to embody the present invention.

FIG. 2 is a block diagram of a converged technology system 414 comprising the DVD player 200 of FIG. 1. The DVD player 400 is coupled to a computer system unit 402. Compatibility between the DVD player 400 and the computer system unit may be enabled by the convergence functionality module 404. The inputs to the computer system unit 402 are handled by the control input 408 module. The control input 408 usually comprises a keyboard or a mouse (not shown) through which a user can control the operation of the computer system unit 402. The control input 408 is coupled to the computer system unit 402. The outputs of the computer system unit 402 are displayed on the video display monitor 406 which is also coupled to the computer system unit 402. The computer system unit further comprises one or more processing units 410 and memory means 412.

The system is initially set with the content-blocking scheme disabled, thus permitting any user to have unrestricted access. In order to activate or enable content-blocking, the converged technology system 414 is initialized with a preset password stored in the memory means 412 which is disclosed to the buyer upon purchase.

By inputting the password to the computer system unit 402 via the control input 408, a user, such as the head of the household, can establish themselves as a master user and enable the content-blocking. The master user can also establish other users. The name of the user as well as a password to verify identity can be input to the computer system unit 402 through the control input 408. The computer system unit 402 then maintains a list of users and corresponding passwords which can be stored in memory means 412.

The master user can then set restrictions that apply to each user. These restrictions can also be entered by the master user through control unit 408 and stored by the computer system unit 402 into memory means 412. The master user also has the ability to disable the content-blocking.

After the users, passwords, and restrictions have been established by the master user, the converged technology system 414 will require a user name and password to operate. Upon an attempt to operate the converged technology system 414, the computer system unit 402 will display on the video display monitor 406 a request, prompting the user to input a user name and password to the computer system unit 402 through the control input 408. Upon receipt of the user name and password, the computer system unit 402 will examine memory means 412 to verify the user/password combination as well as access any restrictions which are applicable to the user.

If there are any restrictions which apply to the user, the computer system unit 402 will examine the DVD disc 202 and confirm based on the PMI pertaining to the title, whether the title is within the applicable restrictions, prior to permitting the DVD player 400 to play it. If the title on the DVD disc 202 lacks PMI, the computer system unit 402 will be unable to make the confirmation, and the DVD player 400 will not play the title. Users with no applicable restrictions will be able to view the title because confirmation is only required for users with active restrictions.

Figure 3:
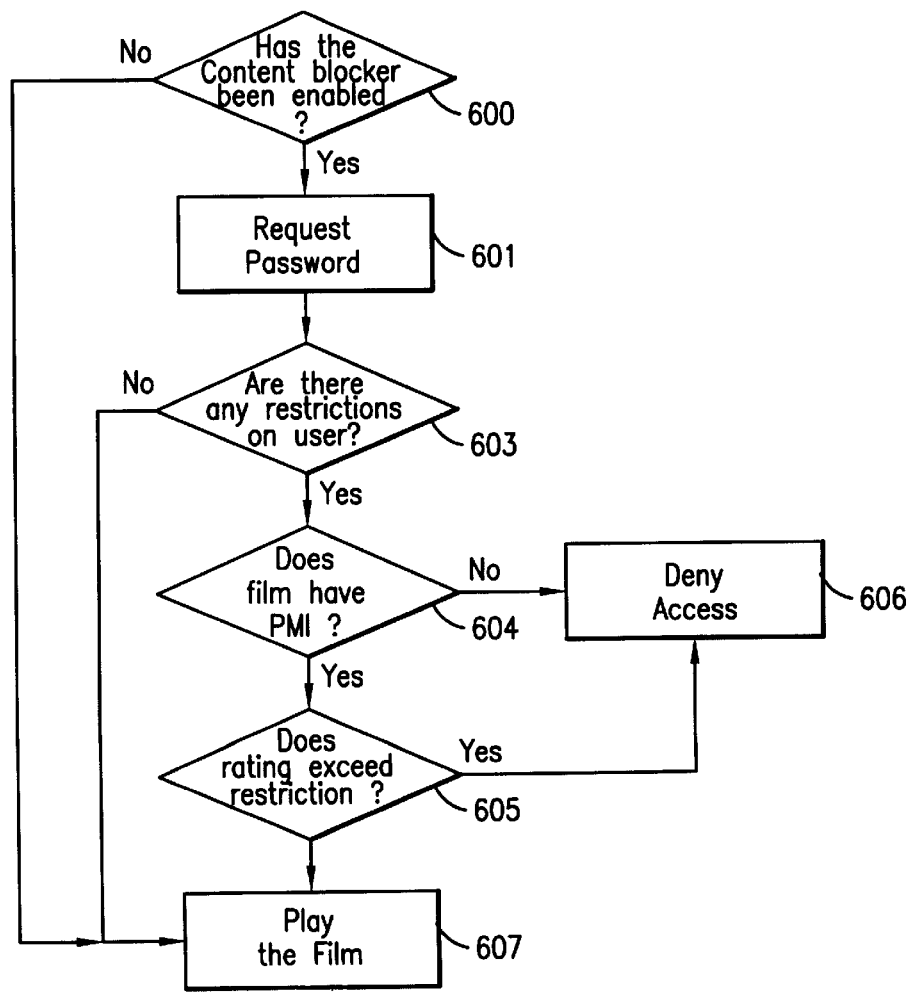
FIG. 3 is a flow chart illustrating a method of the present invention.

Referring now to FIG. 3 a flow diagram illustrating the operation of the system will be described. In step 600, the system first checks to see if the content-blocking is enabled. If the content-blocking is disabled, the system will immediately proceed to playing the film in step 607. On the other hand, if the system is enabled, a password is requested from the user in step 601. If the password is invalid, the system will continue to request a password before it will proceed. Alternatively, the embodiment can be modified so as to permit a limited number of unsuccessful attempts before the system ceases attempting to validate passwords.

Once a password has been accepted, the computer system unit 402 examines memory means 412 to see if any restrictions have been imposed on the user in step 603. If the password corresponds to a user who has no access restrictions, the computer system unit 402 permits the DVD player 400 to play the title in step 607. However, if the password corresponds to a user who has restrictions, the system then checks the DVD disc 202 to see if the title has the requisite PMI in step 604. If the title does not have the requisite information, the computer system unit 402 will deny access in step 606. If the title does have the requisite PMI, the computer system unit 402 will compare the rating of the title with the restrictions that pertain to the user associated with the password in step 605. If the title rating exceeds the restrictions imposed on the user, the computer system unit will not permit the DVD player 400 to play it. On the other hand, if the title rating is within the user's restrictions, the computer system unit 400 will proceed to permit the DVD player 400 to play the title in step 607.

In an alternative embodiment, the master user can establish a restriction chart comprising passwords which required to view titles which exceed a particular restriction. The master user can enter the restriction and the password through the control input 408. The computer system unit 402 then stores the restriction chart into memory means 412.

When a user seeks to have the DVD player 400 play a title on a DVD disc 202, the computer system unit 402 examines the DVD disc 202 for the PMI pertaining to the title sought to be played. If the title does not have PMI, the computer system unit 402 will prompt the user via the video display terminal 406 to enter a user name/password through the control unit 408. The computer system unit 402 will examine memory means 412 to verify the user name/password combination. In order for the computer system unit 402 to permit the DVD player 400 to play the title on the DVD disc, the user name/password must permit unrestricted viewing.

Figure 4:
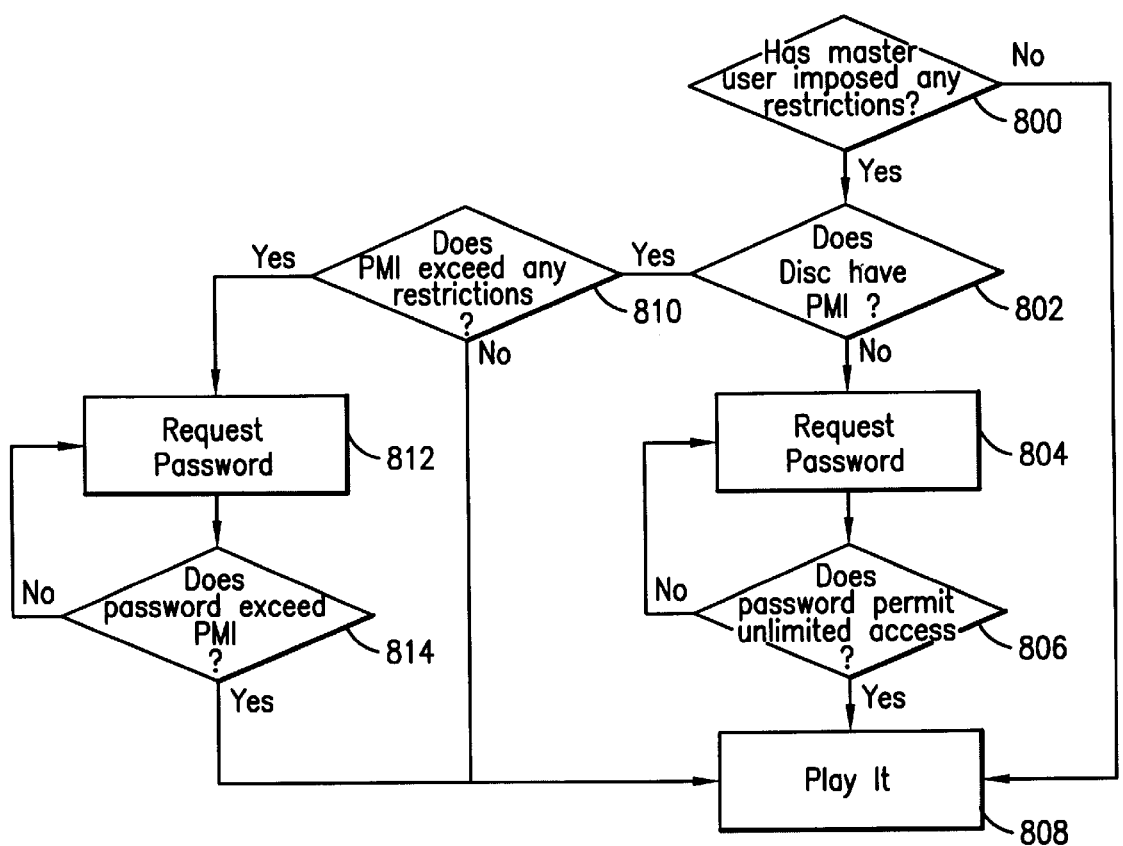
FIG. 4 is a flow chart illustrating an alternative method of the present invention.

Referring now to FIG. 4, a flow diagram illustrating the operation of the alternative embodiment is shown. When a user seeks to play a title stored on a DVD disk 202, the computer system unit 402 examines memory means 412 to see if any restriction chart has been established in step 800. If no restriction chart has been established, the computer system unit 402 proceeds to permit the DVD player 400 to play the title in step 808.

If a restriction chart has been established, the computer system unit 402 will examine the DVD disc 202 for the PMI pertaining to the title sought to be played in step 802.

If the title sought to be played does have the requisite PMI, the computer system unit 402 will check memory means 412 to see if the title exceeds any restrictions in step 810. If there aren't any restrictions that are exceeded, the computer system unit 402 permits the DVD player 400 to play the title. If the PMI of the title exceeds any restriction stored in memory means 412, the computer system unit 402 will prompt the user via the video display terminal 406 to enter a user name/password through the control unit 408 in step 812. Upon receipt of a user name/password, the computer system will examine memory means 412 to verify that the user name/password permits viewing the restricted material step 814. If the user name/password permits viewing the restricted material, the computer system unit 402 will permit the DVD player 400 to play the title in step 808. If the user name/password does not permit unrestricted viewing, the computer system unit will continue to prompt the user via the video display terminal 406 to enter a user name/password through the control unit 408 in step 812.

If the title sought to be played does not have the requisite PMI, the computer system unit 402 will prompt the user via the video display terminal 406 to enter a user name/password through the control unit 408 in step 804. Upon receipt of a user name/password, the computer system will examine memory means 412 to verify that the user name/password permits unrestricted viewing in step 806. If the user name/password permits unrestricted viewing, the computer system unit 402 will permit the DVD player 400 to play the title in step 808. If the user name/password does not permit unrestricted viewing, the computer system unit will continue to prompt the user via the video display terminal 406 to enter a user name/password through the control unit 408 in step 804.

Although the invention has been described with a certain degree of particularity, it should be recognized that elements thereof may be altered by persons skilled in the art without departing from the spirit and scope of the invention. One alteration of the invention can be to establish the identity of the user through means other than a password. Another alteration of the invention can involve embodiments wherein the passwords can be readily changed. Other alterations are possible. Further, where DVD is used herein (including in the claims) DVD-like should also be expressly understood. The invention is limited only by the following claims and their equivalents.

What is claimed is:

1. A method for selectively permitting a user to play a DVD disc received at a DVD player, the method comprising the steps of:
    ascertaining whether the DVD disc lacks parental management information;
    establishing an identity of the user; and
    selectively permitting access to the information stored on the DVD disc based on the established identity of the user, if the DVD disc is ascertained to lack the parental management information.

2. The method of claim 1, wherein the parental management information comprises a movie rating.

3. The method of claim 1, wherein said step of selectively permitting comprises the step of:
    determining whether the established identity of the user corresponds to one or more unrestricted users having an unrestricted access level.

4. The method of claim 3, wherein the step of selectively permitting further comprises the steps of:
    permitting access to the information stored on the DVD disc if the established identity of the user is determined to correspond to at least one of the one or more unrestricted users; and
    denying access to the information stored on the DVD disc if the established identity of the user is determined not to correspond to the at least one of the one or more unrestricted users.

5. The method of claim 3, wherein the step of determining comprises the step of:

searching restriction information associated with users of the DVD player to determine whether the established identity of the user is associated with one or more access restrictions.

6. The method of claim 1, further comprising the steps of:

determining whether the parental management information violates an access restriction associated with the established identify of the user, if the DVD disc is ascertained to contain parental management information;

permitting access to the information stored on the DVD disc if the parental management information is determined not to violate the access restriction associated with the established identity of the user; and denying access to the information stored on the DVD disc if the parental management information is determined to violate the access restriction associated with the established identity of the user.

7. A method for selectively permitting access to information stored on a DVD disc received at a DVD player, the method comprising the steps of:

ascertaining whether the DVD disc lacks parental management information; and selectively permitting access to the information stored on the DVD disc in response to user input of a first code, if the DVD disc is ascertained to lack the parental management information.

8. The method of claim 7, wherein the parental management information comprises a movie rating.

9. The method of claim 7, wherein the step of selectively permitting comprises the steps of:

determining whether the first code enables unrestricted access to information accessible on the DVD player;

permitting access to the information stored on the DVD disc if the first code enables the unrestricted access; and denying access to the information stored on the DVD disc if the first code does not enable the unrestricted access.

10. The method of claim 7, further comprising the step of:

selectively permitting access to information stored on the DVD disc in response to user input of a second code, if the DVD disc is ascertained to include the parental management information.

11. The method of claim 10, wherein the step of selectively permitting access to the information stored on the DVD disc in response to the user input of the second code comprises the steps of:

determining whether the parental management information violates an access restriction associated with the second code;

permitting access to the information stored on the DVD disc if the parental management information does not violate the access restriction associated with the second code; and denying access to the information stored on the DVD disc if the parental management information violates the access restriction associated with the second code.

12. The method of claim 10, wherein the first code and the second code are the same.

13. A method for automatically permitting access to information stored on a DVD disc, the method comprising the steps of:

storing restriction information associated with users of the DVD player;

retrieving parental management information stored on the DVD disk; and automatically permitting access to the information stored on the DVD disc if the parental management information does not violate the stored restriction information associated with each of the users of the DVD player.

14. The method of claim 13, wherein the parental management information comprises a movie rating.

15. The method of claim 13, further comprising the step of:

requesting user input of a code for enabling access to the information stored on the DVD disc if the parental management information violates the stored restriction information associated with at least one of the users of the DVD player.

16. An apparatus for selectively permitting a user to access information stored on a DVD disc received at a DVD player, the apparatus comprising:

a processor for controlling functionalities of the DVD player; and a memory unit coupled to the processor for storing access restrictions associated with users of the DVD player, the memory unit further for storing instructions which when executed by the processor cause the processor to:

ascertain whether the DVD disc lacks parental management information;

establish an identity of the user; and selectively permit access to the information stored on the DVD disc based on the established identity of the user, if the DVD disc is ascertained to lack the parental management information.

17. The apparatus of claim 16, wherein the memory unit further includes instructions which when executed by the processor cause the processor to:

determine whether the established identity of the user corresponds to one or more unrestricted users having an unrestricted access level.

18. The apparatus of claim 17, wherein the memory unit further includes instructions which when executed by the processor cause the processor to:

permit access to the information stored on the DVD disc if the established identity of the user is determined to correspond to at least one of the one or more unrestricted users; and deny access to the information stored on the DVD disc if the established identity of the user is determined not to correspond to the at least one of the one or more unrestricted users.

19. An apparatus for automatically permitting access to information stored on a DVD disc, the apparatus comprising:

circuitry for performing functionalities of the DVD player;

a processor for controlling the circuitry; and a memory unit coupled to the processor for storing restriction information associated with users of the DVD player, the memory unit further for storing instructions which when executed by the processor cause the processor to:

retrieve parental management information stored on the DVD disk; and automatically permit access to the information stored on the DVD disc if the parental management information does not violate the stored restriction information associated with each of the users of the DVD player.

20. The apparatus of claim 19, wherein the memory unit further includes instructions which when executed by the processor cause the processor to:

request user input of a code for enabling access to the information stored on the DVD disc if the parental management information violates the stored restriction information associated with at least one of the users of the DVD player.

21. An apparatus for selectively permitting a user to play a DVD disc received at a DVD player, the apparatus comprising:

an identifier for establishing an identity of the user;

a reader for determining whether the DVD disc contains parental management information; and access circuitry coupled to the reader and the identifier for selectively permitting access to information stored on the DVD disc based on the established identity of the user, if the DVD disc does not include the parental management information.

22. The apparatus of claim 21 further comprising:

a memory unit for storing access restrictions associated with a plurality of users of the DVD player;

a comparator, coupled to the reader, the identifier and the memory unit, for determining whether the parental management information violates one or more of the access restrictions associated with the established identity of the user.

* * * * *